United States Patent
Witham et al.

(10) Patent No.: US 10,632,685 B2
(45) Date of Patent: *Apr. 28, 2020

(54) MOBILE DEVICE SCREEN PROTECTOR INSTALLATION TRAY AND SYSTEM

(71) Applicant: NLU Products, L.L.C., Lehi, UT (US)

(72) Inventors: Chris Witham, Lehi, UT (US); Kirk Feller, Lehi, UT (US)

(73) Assignee: NLU Products, L.L.C., Lehi, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/134,880

(22) Filed: Sep. 18, 2018

(65) Prior Publication Data

US 2019/0134921 A1 May 9, 2019

Related U.S. Application Data

(63) Continuation of application No. 15/443,989, filed on Feb. 27, 2017, now Pat. No. 10,076,872, which is a
(Continued)

(51) Int. Cl.
*B29C 65/48* (2006.01)
*H04B 1/3888* (2015.01)
*G06F 1/16* (2006.01)
*B29C 65/00* (2006.01)
*H04M 1/18* (2006.01)
(Continued)

(52) U.S. Cl.
CPC .............. *B29C 65/48* (2013.01); *B29C 66/01* (2013.01); *G06F 1/1626* (2013.01); *H04B 1/3888* (2013.01); *B29L 2031/768* (2013.01);

*G06F 2200/1634* (2013.01); *H04M 1/0266* (2013.01); *H04M 1/185* (2013.01)

(58) Field of Classification Search
USPC ......... 156/27, 247, 249, 289, 297, 701, 391, 156/750
See application file for complete search history.

(56) References Cited

U.S. PATENT DOCUMENTS 7,784,610 B2    8/2010   Mason
8,369,072 B1    2/2013   Alonzo et al.
(Continued)

OTHER PUBLICATIONS http://www.perfectfittech.com/blogs/news/6633742-iphone-5-screen-shield-screen-protector-with-perfect-fit-applicator; accessed Apr. 14, 2016
(Continued)

*Primary Examiner* — Sing P Chan
(74) *Attorney, Agent, or Firm* — Thorpe North & Western, LLP

(57) ABSTRACT

A screen protector installation tray can include an alignment tray and a screen protector retained within the alignment tray. Also, a method for applying a mobile device screen protector to a mobile device, including retaining a screen protector within an alignment tray, applying the alignment tray to the mobile device, interfacing the screen protector with a screen of the mobile device, transferring the glass screen protector from the alignment tray to the mobile device, and removing the alignment tray. Additionally, a mobile device screen protector installation kit, including an alignment tray, a screen protector, and instructions for applying a screen protector to a screen of a mobile device.

20 Claims, 9 Drawing Sheets

Related U.S. Application Data continuation-in-part of application No. 14/671,298, filed on Mar. 27, 2015, now Pat. No. 9,588,547.

(60) Provisional application No. 61/971,347, filed on Mar. 27, 2014, provisional application No. 62/402,607, filed on Sep. 30, 2016.

(51) Int. Cl.
*H04M 1/02* (2006.01)
*B29L 31/00* (2006.01)

(56) References Cited

U.S. PATENT DOCUMENTS

| | | |
|---|---|---|
| 8,517,367 B1 | 8/2013 | Napier |
| 8,720,683 B2 | 5/2014 | Mao |
| 9,588,547 B2 | 3/2017 | Witham et al. |
| 10,076,872 B2 * | 9/2018 | Witham .............. G06F 1/1626 |
| 2004/0246386 A1 | 12/2004 | Thomas et al. |
| 2014/0246339 A1 | 9/2014 | Chung et al. |
| 2015/0013890 A1 | 1/2015 | Rostami |

OTHER PUBLICATIONS https://www.kickstarter.com/projects/kioky/kioky-perfect-fit-applicator-iphone-screen-protect; accessed Apr. 14, 2016.

http://www.tylt.com/search/?q=alin-screen-protector//; accessed Apr. 14, 2016.

Non-patent literature document are located in parent U.S. Appl. No. 15/443,989.

* cited by examiner

MOBILE DEVICE SCREEN PROTECTOR INSTALLATION TRAY AND SYSTEM

RELATED APPLICATIONS

This application is a continuation of U.S. patent application Ser. No. 15/443,989, filed Feb. 27, 2017, which is a continuation-in-part of U.S. patent application Ser. No. 14/671,298, filed Mar. 27, 2015, which claims the benefit of U.S. Provisional Patent Application No. 61/971,347, filed Mar. 27, 2014 which are each incorporated herein by reference. This application also claims the benefit of U.S. Provisional Patent Application No. 62/402,607, filed Sep. 30, 2016 which is also incorporated herein by reference.

BACKGROUND

Screen protectors are routinely used by consumers to protect mobile device screens from damage. Screen protectors are most frequently formed of a thin polymer film with an adhesive backing, although recent products also offer thin glass protectors. The film is oriented on the screen and provides additional protection of the native screen from damage such as scratches and impact fractures. Unfortunately, most screen protectors are fixed in place once contacted with the native screen. Careful orientation and installation is required to avoid misplaced screen protectors. Some products allow for repositioning, but challenges still remain in orienting screen protectors without damage or misalignment. Therefore, there is a need for an improved system and method for installing mobile device screen protectors.

SUMMARY

A screen protector installation system can include an alignment tray and a glass screen protector. The alignment tray can have a base, alignment walls, an alignment ridge, base walls, and a screen protector access aperture. The base has a device side and an opposing side. The base walls are disposed at a perimeter edge of the base, thus defining a screen protector cavity on the device side of the base. The glass screen protector can be retained within the screen protector cavity. The screen protector access aperture is formed within the base of the alignment tray. The alignment ridge is disposed at a perimeter edge of the base walls. The alignment walls are disposed at a perimeter edge of the alignment ridge. The alignment walls and alignment ridge define a device alignment cavity.

A method of applying a mobile device screen protector can include retaining a glass screen protector within an alignment tray. The alignment tray can then be applied to the mobile device. The screen protector can be interfaced with the screen of a mobile device and transferred from the alignment tray to the mobile device. The alignment tray can be removed from the mobile device.

A mobile device screen protector installation kit can include an alignment tray, a glass screen protector, and instructions. The instructions can specify placing the alignment tray above the mobile device with the device side facing the mobile device and applying the alignment tray onto the mobile device.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

Figure 1:
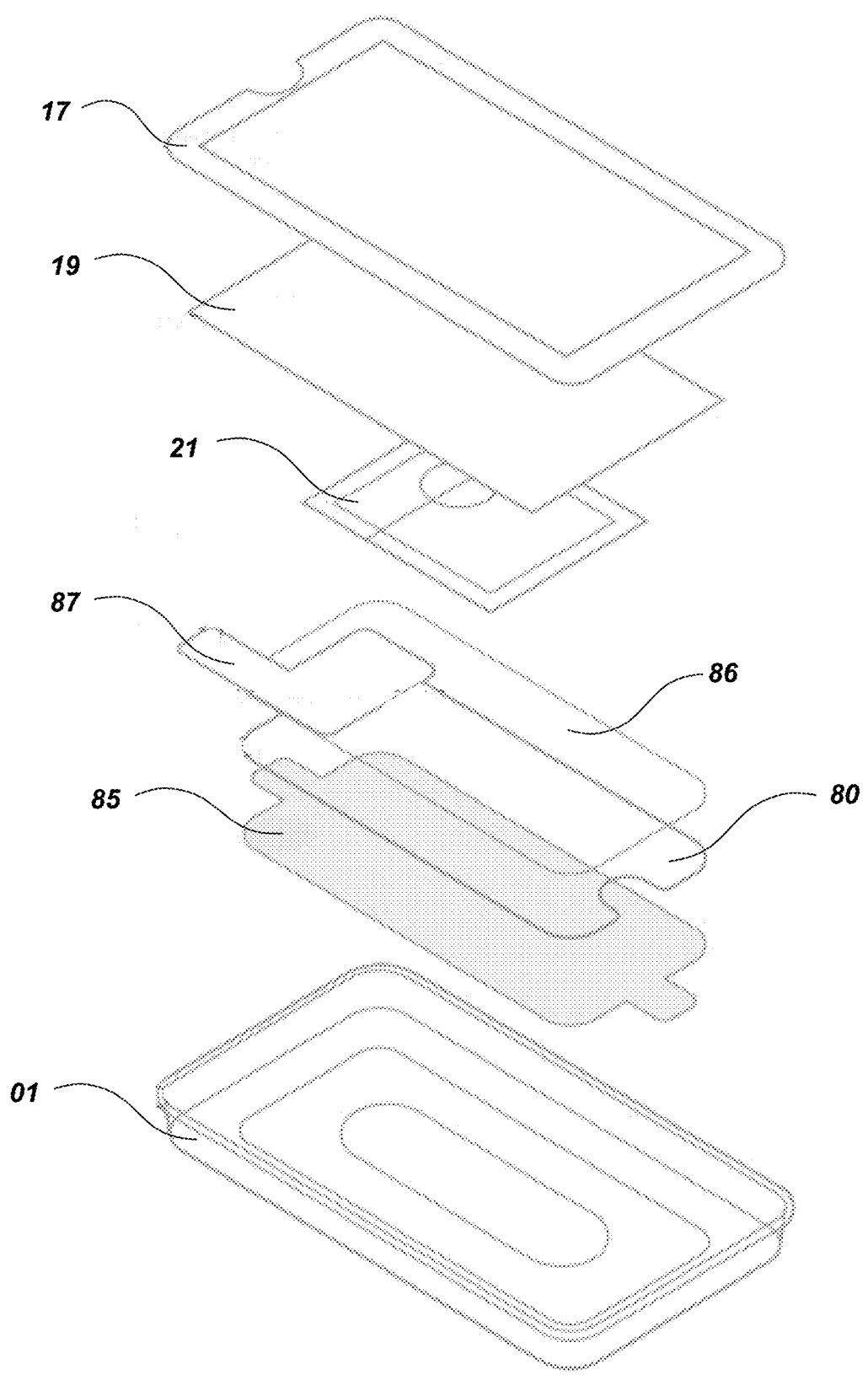
FIG. 1 is a sectional view of a screen protector installation system in accordance with one example of the invention.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

The singular forms "a," "an," and "the" include plural referents unless the context clearly dictates otherwise. Thus, for example, reference to "an adhesive" includes reference to one or more of such materials and reference to "applying" refers to one or more such steps.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, "fit tolerance" refers to the distance between a perimeter edge of a mobile device body and alignment walls of the alignment tray, as described herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Screen Protector Installation Tray and System

Screen protector alignment trays can be useful for properly aligning screen protectors with the screen of a mobile or electronic device. However, conventional alignment trays require the user to insert the device into the alignment tray. Thus, alignment trays can be challenging for the user to operate. For example, the user must align a comparatively heavy mobile device with a light alignment tray, all while the user's field of view of the alignment tray is obstructed by the mobile device itself. Further, once the user begins inserting the mobile device into the alignment tray, the user's fingers can engage the walls of the alignment tray. This can cause the user to drop the mobile device, causing damage to the mobile device, the screen protector, or both. It can also result in the mobile device engaging the screen protector at an unanticipated angle, resulting in misalignment of the mobile device, despite the use of an alignment tray.

The systems, methods, and kits described herein can be used to overcome these and other problems associated with conventional alignment trays. A number of examples of installation systems, methods, and kits are referred to herein. Each of these examples can be used to describe one another. Thus, when referring to one example of an installation system, the same feature can be used to describe other example installation systems, methods, and/or kits, and vice versa.

Referring to FIG. 1, a stacked sectional view of an example mobile device screen protector installation system is illustrated. Thus, in some examples, the mobile device screen protector installation system can include an alignment tray 01 and a glass screen protector 80. In some examples, a backing liner 85 can be removably attached to a base side of the glass screen protector 80. In some additional examples, a release liner 86 can also be removably attached to a placement side of the glass screen protector 80. In some examples, where a release liner is used, the release liner 86 can include a peel tab 87 to facilitate removal of the release liner 86. In some examples, the peel tab 87 can also include installation instructions printed thereon. Additionally, in some examples, the mobile device screen protector installation system can include an installation packet 21, which can include a variety of items such as a cleaning cloth, dust removal stickers, and/or other suitable installation accessories. In some further examples, the mobile device screen protector installation system can include installation instructions 19 and/or a welcome card 17 having information regarding device source, device model name and/or number, warranty information, technical support contact information, the like, or a combination thereof.

Figure 2:
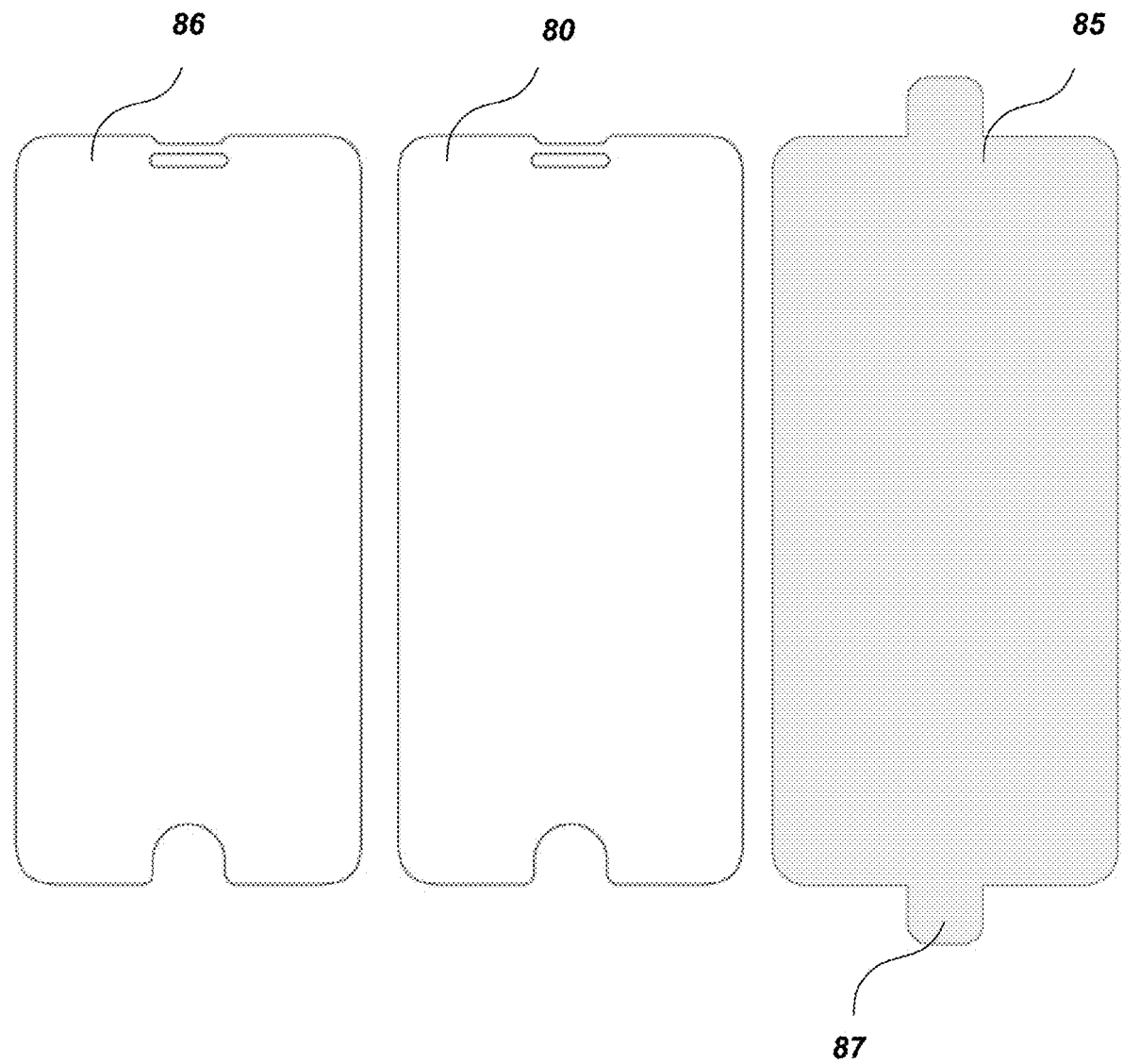
FIG. 2 is a plan view of a glass screen protector and associated release liner and backing liner in accordance with one example of the invention.

A plan view of an example glass screen protector 80 is illustrated in FIG. 2. The glass screen protector can be shaped to align with any suitable smart phone, tablet, or the like. In some examples, an optional release liner 86 can be shaped identically or similarly to the glass screen protector 80, such as is illustrated in FIG. 2. However, the release liner 86 need not have an identical shape to the glass screen protector 80. Where used, the release liner 86 can be removably attached to the glass screen protector 80. Further, an optional backing liner 85 can also be identically or similarly shaped to the glass screen protector 80, but like the release liner 86, the backing liner 85 need not be identical in shape with the glass screen protector 80. For example, where used, the backing liner can optionally include one or more peel tabs, such as peel tab 87, to facilitate removal of the backing liner 85.

Figure 3:
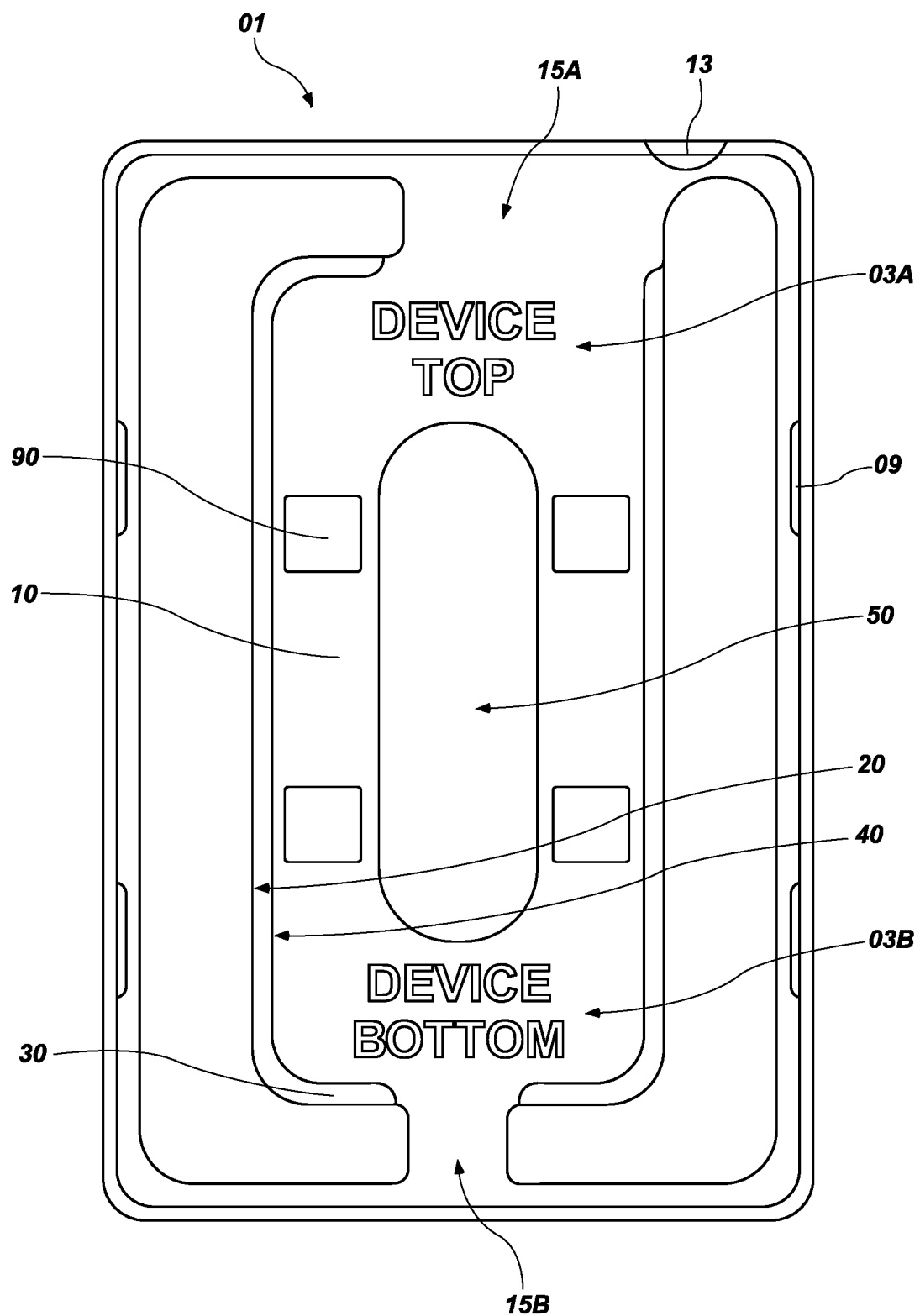
FIG. 3 is a plan view of an applicator tray in accordance with one example of the invention.

A plan view of an example alignment tray 01 is illustrated in FIG. 3. The alignment tray 01 can include a base 10, base walls 40 disposed at a perimeter edge of the base 10 and defining a screen protector cavity, as will be more clearly illustrated in FIG. 4. As further illustrated in FIG. 3, an alignment ridge 30 can be disposed at a perimeter edge of the base walls 40 and alignment walls 20 can be disposed at a perimeter edge of the alignment ridge 30. The alignment ridge 30 and alignment walls 20 can define a device alignment cavity, which will be more clearly illustrated in FIG. 4. A screen protector access aperture 50 can be formed within the base 10.

In some examples, a number of gaps, such as gaps 15A, 15B, or other suitable gaps, can be formed in the alignment tray such that the base walls 40, alignment ridge 30, and alignment walls 20 are either partially or fully separated into two or more alignment sections. The gaps can accommodate structural features, such as peel tabs, or the like, or can be used to facilitate ease of access where desirable. In some examples, where more than one gap is used, the gaps can be commensurate in size. In other examples, such as is illustrated in FIG. 3, the gaps can be of different sizes. In this particular example, gap 15A can be sized larger than gap 15B to accommodate a backing liner that includes a peel tab on the top and the bottom and a release liner that includes a peel tab only on the top side and that does not overlap with the peel tab of the backing liner. As such, gap 15A can be somewhat wider than gap 15B.

In some examples, a spacer 90 can be adhered or otherwise attached to the device side of the base 10 to maintain a gap between the glass screen protector, and optionally the backing liner, and the base 10 of the alignment tray 01. In some examples, the spacer 90 can include a retention adhesive to adhere to the glass screen protector or a backing liner that is removably attached to the glass screen protector. Whether the retention adhesive is also adhered on spacer 90 or directly on base 10, in some examples the retention adhesive can retain the glass screen protector within the screen protector cavity.

In some additional examples, mobile device orientation instructions can also be included or formed on the alignment tray. For example, mobile device orientation instructions, such as 03A and/or 03B, can be included on the base or other section of the alignment tray. The device orientation instructions can be printed on the alignment tray, molded into the alignment tray, the like, or a combination thereof.

In some examples, the alignment tray can include a packaging insert retention feature 09, such as a tab, flap, notch, clip, slit, adhesive, the like, or a combination thereof. This can help retain a welcome card, instructions, a cleaning packet, or other suitable accessories within the alignment tray during packaging, shipping, and the like. Additionally, in some examples, the alignment tray can include a gripping feature, such as finger hold 13, to facilitate positioning and maneuvering of the alignment tray.

Figure 4:
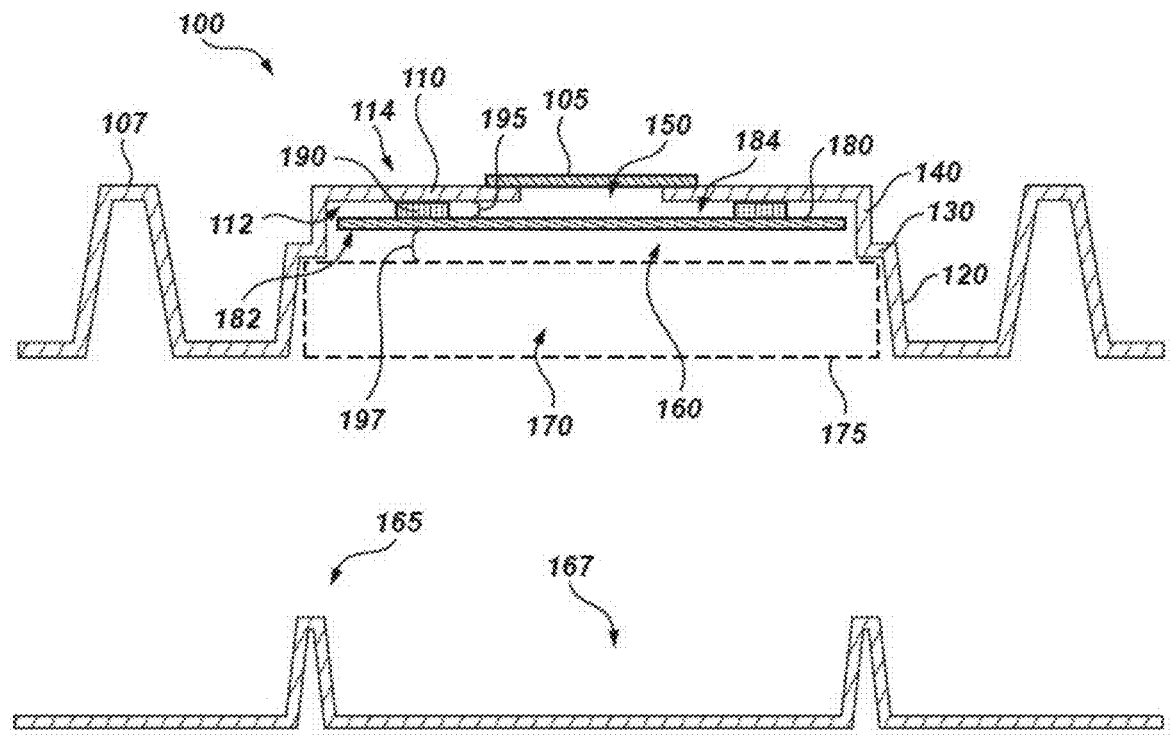
FIG. 4 is a side cross-sectional view of a screen protector installation system and associated packaging tray in accordance with one example of the invention.

In FIG. 4 a cross-sectional view of another embodiment of a mobile device screen protector installation system is illustrated. The system can include an alignment tray 100, a glass screen protector 180, and optionally a retention adhesive and/or a removable cover 105.

The alignment tray 100 can have a base 110 having a device side 112 and an opposing side 114. A screen protector access aperture 150 can be formed within the base 110, thus allowing a user to access the device side 112 of the base 110 from the opposing side 114. The screen protector access aperture can be shaped to allow at least one finger of a user to pass through the aperture. As a general guideline the access aperture can have a width from about 15 mm to 25 mm. In one example, the aperture can be an elongate aperture to allow a user to apply pressure at multiple points along the screen protector. In this case the elongate aperture for a smartphone, for example, can often have a width of about 15 to 25 mm and length of about 60 to 110 mm, although other dimensions may be suitable depending on the size of the corresponding screen protector. For example, sizes corresponding to tablet devices can be increased to allow a user to apply pressure to at least two points with at least one point each on opposing sides of a major axis of symmetry (i.e an axis extending across a shorter dimension of the screen protector).

In some examples, a removable cover 105 can be disposed on the opposing side 114 of the base 110 at least partially covering the screen protector access aperture 150. Base walls 140 can be disposed at a perimeter edge of the base 110, defining a screen protector cavity 160 on the device side 112 of the base 110. An alignment ridge 130 can be disposed at a perimeter edge of the base walls 140. Additionally, alignment walls 120 can be disposed at a perimeter edge of the alignment ridge 130 defining a device alignment cavity 170 within the alignment tray 100, also on the device side 112. Notably, the screen protector cavity 160 can be smaller than the device alignment cavity 170 to allow the screen protector 182 to be spaced and held apart from a corresponding mobile device 175 by alignment ridge 130. In this manner, the screen protector 182 and mobile device 175 can be aligned without contact until the screen protector 182 is pressed into contact through screen protector access aperture 150. Further, the alignment tray 100 can include support structures 107 or various other structural features for convenience in packaging, gripping, or other purposes.

The alignment tray 100 can be made of any suitable material. In one example, the alignment tray 100 is formed of a transparent material. In one aspect, the alignment tray 100 can be made of a molded transparent film. Any suitable material can be used to prepare the molded transparent film. Some non-exclusive examples of such materials can include polyurethane, thermoplastic polyurethane, aliphatic thermoplastic polyurethane, polyvinyl chloride, chlorinated polymer, polyolefin, polyester, polyethylene terephthalate, polyamide, polyacrylate, polymethyl methacrylate, styrene methyl methacrylate, styrene acrylonitrile, general purpose polystyrene, polycarbonate, polysilicone, composites thereof, or combinations thereof. In one aspect, the molded transparent film is made from polyethylene terephthalate.

As previously mentioned, the base 110 and the base walls 140 define a screen protector cavity 160 on the device side 112 of the base 110. The screen protector cavity 160 can have any suitable shape and dimensions to accommodate a screen protector 180 suitable for a mobile or electronic device (e.g. smartphone, tablet, etc). The screen protector cavity 160 can have a variety of depths to accommodate varying thicknesses or shapes of screen protectors, a gap 195 between the screen protector 180 and the base 110, a gap 197 between the screen protector 180 and the alignment ridge 130, and the like. In one specific example, a plurality of spacing elements 190 can be used to maintain gaps 195 and 197. In one embodiment, the gap 195 can be from 0.1 mm to 2 mm. In another embodiment, the gap 195 can be from 0.2 mm to 1 mm. The spacing elements can be made from any suitable material and can optionally include a removable adhesive that allows the spacing elements to engage and be removed from the screen protector. Non-limiting examples of spacing element materials can include polyethylene foam, polystyrene foam, pressure sensitive adhesives, fugitive glue, hot melt adhesives, latex, silicone, or combinations thereof.

Though FIG. 4 illustrates an embodiment of the current technology that includes a screen protector cavity 160 having gaps 195 and 197, the screen protector cavity 160 need not accommodate such gaps. The screen protector cavity 160 can be designed to allow the screen protector 180 to come into contact with the base 110 and to be substantially planar with the alignment ridge 130, thus allowing the screen protector 180 to come into contact with a mobile device upon application of the alignment tray 100. Thus, in this case, gap 197 would be eliminated. Additionally, the screen protector cavity 160 may be adapted to have only one of gaps 195 and 197. Numerous adaptations and configurations can be accommodated and contemplated by the current technology.

In some examples, a retention adhesive can be used to retain the screen protector 180 within the screen protector cavity 160. In one embodiment, the retention adhesive can directly contact both a base side 184 of the screen protector 180 and the device side 112 of the base 110. In another embodiment, the retention adhesive can be disposed on opposing sides of a plurality of spacing elements 190, such that the base side 184 of the screen protector 180 engages the device side 112 of the base 110 via the spacing elements 190. In another embodiment, the retention adhesive can be disposed on the removable cover 105, such that the retention adhesive engages the opposing side 114 of the base 110 and the base side 184 of the screen protector 180. This, and other similar arrangements, can allow the base side 184 of the screen protector 180 to be in contact with the device side 112 of the base 110. The retention adhesive can also be disposed on the base walls 140 such that the screen protector 180 is adhered to the base walls 140 rather than the base 110 directly.

The retention adhesive can be any suitable adhesive to retain the screen protector 180 within the screen protector cavity 160. Typically, the adhesive leaves little to no adhesive residue on the screen protector 180 and allows the screen protector 180 to be easily disengaged from the alignment tray 100. In some embodiments, more than one retention adhesive can be used. In one specific example, a plurality of spacing elements 190 can be used in connection with the retention adhesive. The opposing sides of the spacing elements 190 can have the same retention adhesive disposed thereon. In one aspect, the retention adhesive can be disposed more thickly on the opposing side that engages the base 110 and more lightly on the opposing side that engages the screen protector 180. In one aspect, the retention adhesive can be selected so that it can be evenly disposed on each opposing side of the plurality of spacing elements 190, but where the plurality of spacing elements will more strongly adhere to the base 110 than the screen protector 180. In another aspect, different retention adhesives can be used on each opposing side of the plurality of spacing elements 190, such that the plurality of spacing elements 190 are more strongly adhered to the base 110 than the screen protector 180. Some non-exclusive examples of suitable retention adhesives include fugitive adhesives, hot melt adhesives, pressure sensitive adhesives (described in greater detail below), or combinations thereof.

Figure 5:
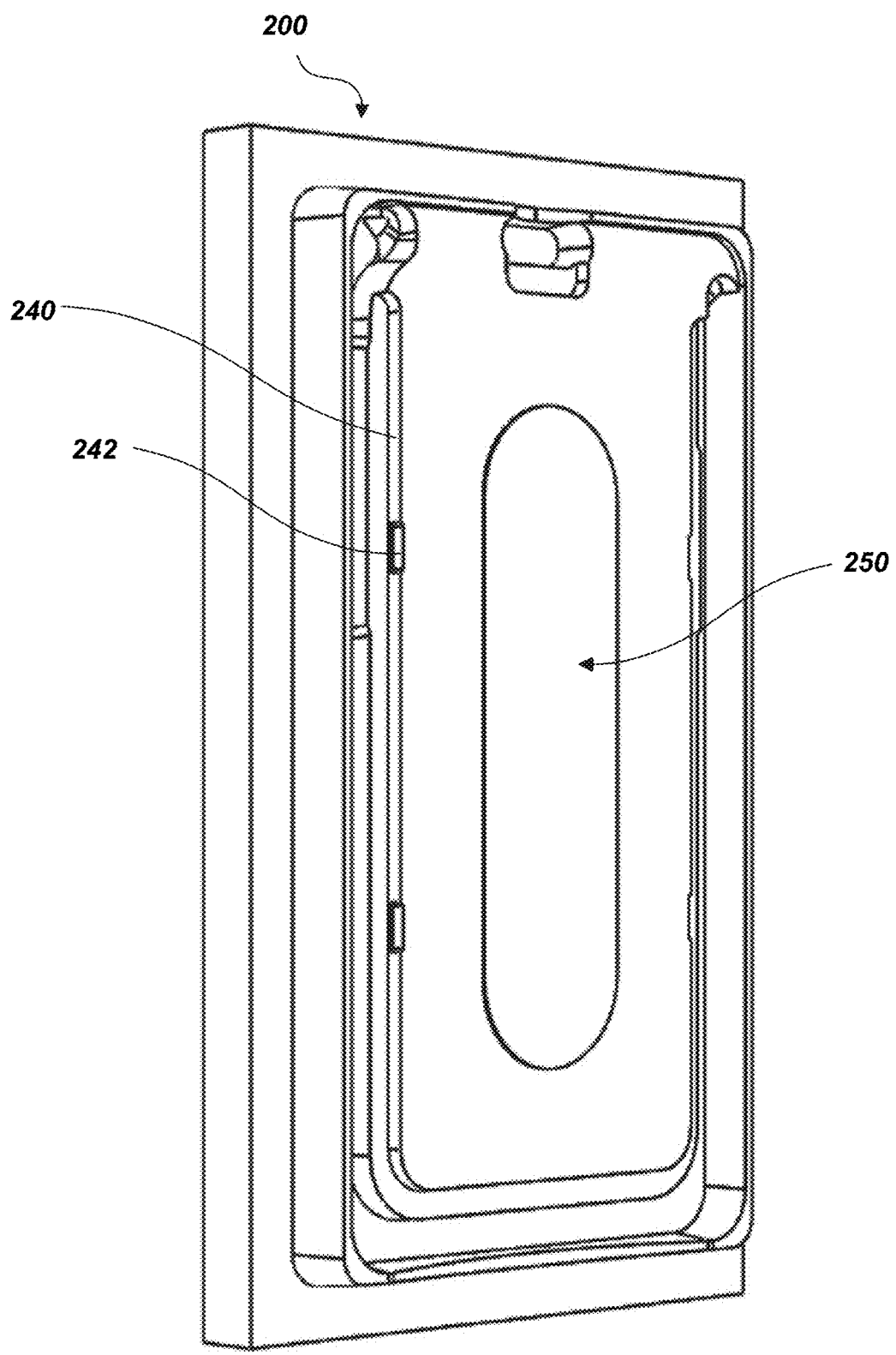
FIG. 5 is a perspective view of a screen protector applicator tray in accordance with one example of the invention.

In yet other examples, the alignment tray can include a plurality of glass screen protector retention features oriented along the base walls to retain the glass screen protector within the screen protector cavity. In some examples, the plurality of glass screen protector retention features can form a physical interference fit to retain the glass screen protector within the screen protector cavity. However, a variety of glass screen protector retention features can be used. Non-limiting examples can include a tab, flap, notch, clip, slit, adhesive, the like, or a combination thereof. FIG. 5 illustrates one example of an alignment tray 200 that includes a plurality of glass screen protector retention features 242 oriented along a base wall 240. In this case, the retention features 242 are a set of tab protrusions (seen from a back side) which extend into a space occupied by the mobile device so as to physically frictionally engage with edges of the glass screen protector. As such, a user can access a glass screen protector via the screen protector access aperture 250 to disengage the glass screen protector (not shown) from the glass screen protector retention features 242 to transfer the glass screen protector to a screen of a mobile electronic device (not shown). Thus, the screen protector can be retained within the screen protector access aperture via a retention adhesive, a glass screen protector retention feature, the like, or a combination thereof.

Returning again to FIG. 4, the screen protector 180 can be made of any suitable transparent material. Such materials can include tempered glass, urethane, polyurethane, polymethyl methacrylate, polycarbonate, or any other suitable material. In one embodiment the screen protector is a glass screen protector.

Additionally, in some examples, the screen protector can include a release liner on the placement side 182 of the screen protector 180. The release liner can be made of any suitable material. Some non-exclusive examples of release liner materials can include polyester, polyethylene terephthalate, polypropylene, high density polyethylene, low density polyethylene, or combinations thereof. The release liner can protect adhesive on the placement side 182 of the screen protector 180 from debris which can cause undesirable visual artifacts when trapped between the screen protector 180 and a mobile device 175. Thus, the release liner can be removed immediately prior to placement to reduce chances of attracting debris.

In some examples, the glass screen protector can include a backing liner (not shown) on a base side 184 of the glass screen protector 180. The backing liner can be made of the same or similar materials as the release liner. The backing liner can protect the base side 184 of the glass screen protector from residual retention adhesive, scratches, and the like that can affect the function and/or presentation of the glass screen protector after placement. The backing liner can generally be removed after placement of the glass screen protector 180 and removal of the alignment tray 100.

A placement adhesive can be included on the placement side 182 of the screen protector 180. Any suitable placement adhesive can be used to adhere the screen protector 180 to the mobile device 175. The placement adhesive can include, but is not limited to, a pressure sensitive adhesive, such as acrylic based polymers, acrylic emulsion polymers, natural elastomeric polymers, synthetic elastomeric polymers, elastomeric copolymer microspheres, vinyl ethers, silicone, or combinations thereof. Suitable pressure sensitive adhesive materials can contain, for example, a polymer as a principal constituent, such as acrylic type polymers, block copolymers, natural or recovered rubbers, styrene butadiene rubbers, ethylene and vinyl acetate random copolymers, ethylene vinyl acrylic terpolymers, polyisobutylene poly(vinyl ethers), etc. In a specific aspect, elastomers used in the adhesive can be based on acrylics, butyl rubber, ethylene-vinyl acetate, natural rubber, nitriles, silicone rubber, styrene block copolymers, styrene-butadiene-styrene, styrene-ethylene/butylene-styrene, styrene-ethylene/propylene, styrene-isoprene-styrene, vinyl ethers, etc. Useful elastomeric polymers that may be incorporated in the adhesive include natural rubber (polyisoprene), polybutadiene, synthetic polyisoprene, random styrene-butadiene polymers, styrene-butadiene block copolymers, multiarmed and repeating (SB) copolymers, styrene-butadiene-styrene block copolymers, styreneisoprene block copolymers, styrene-isoprene-styrene block copolymers, multiarmed styrene-isoprene, block copolymers, and the like. Other elastomers, such as the ethylene-propylene diene rubbers, styrene-ethylene/butylene, styrene block copolymers, styrene-ethylene/propylene-styrene block copolymers, and the like may also be used.

In addition to the aforementioned materials, other materials can be present in the adhesive to impart desired properties. For example, plasticizers, antioxidants, filler materials, and/or pigments can also be included in the adhesive compositions. Cutting agents such as waxes and surfactants also can be included in the adhesives. Light stabilizers, heat stabilizers, and UV absorbers or blockers also can be included in the adhesive compositions. Ultraviolet absorbers include benzo-triazol derivatives, hydroxy benzyl phenones, esters of benzoic acids, oxalic acid, diamides, etc. Light stabilizers include hindered amine light stabilizers, and the heat stabilizers include dithiocarbamate compositions such as zinc dibutyl dithiocarbamate, although other stabilizers may be suitable. The adhesive materials can contain a mixture of solid tackifying resins and liquid tackifying resins. In a particular aspect, a pressure sensitive adhesive can be based on an elastomer compounded with a suitable tackifier (e.g., a rosin ester).

As previously described, the alignment ridge 130 and the alignment walls 120 define a device alignment cavity 170. The alignment walls 120 are adapted to direct a mobile device 175 into proper placement within the device alignment cavity 170. The device alignment cavity 170 is adapted to properly align the screen protector 180 with the mobile device 175. The alignment walls 120 can be tapered to the alignment ridge 130 or they can be substantially perpendicular with the alignment ridge 130. The alignment ridge 130 is adapted to engage the mobile device 175 such that, when properly aligned, the alignment tray 100 is supported on the mobile device 175 at the alignment ridge 130. The alignment ridge 130 can be spaced at a depth to align the screen protector 180 with a screen of the mobile device 175 without bringing the screen protector 180 into contact with the screen of the mobile device 175. In another embodiment, the alignment ridge 130 can be spaced at a depth to both align the screen protector 180 with a screen of the mobile device 175 and bring the screen protector 180 into contact with the screen of the mobile device 175. In one embodiment, the alignment walls 120 can have a length that allows the bottom of the alignment tray 100 to be substantially planar with the bottom of the mobile device 175. In another embodiment the alignment walls 120 can have a length that allows the alignment tray 100 to be suspended on the mobile device 175, wherein the bottom of the alignment tray 100 does not extend to the bottom of the mobile device 175. The alignment walls 120 can be a continuous perimeter or segmented having at least four segments or alignment features. The device alignment cavity 170 can be designed to receive any suitable electronic or mobile device 175 including, but not limited to tablet computers, mobile phones, game consoles, and the like. Further, the device alignment cavity 170 can be adapted to have a very tight fit tolerance for any electronic or mobile device 175 for which the alignment tray 100 is designed or configured. In one embodiment, the fit tolerance is less than 2 mm. In another embodiment, the fit tolerance is less than 1 mm. In yet another embodiment, the fit tolerance is less than 0.5 mm.

Where used, a removable cover 105 can at least partially cover the screen protector access aperture 150. In one embodiment, the removable cover 105 can cover the entire screen protector access aperture 150. In another embodiment, the removable cover 105 only partially covers the screen protector access aperture 150. The removable cover 105 can be made of any suitable material. Some non-exclusive examples of suitable materials for the removable cover are urethane, polyurethane, polyvinyl chloride, polyester, polyethylene terephthalate, ethylene vinyl acetate, or combinations thereof. The removable cover can include an adhesive to engage the opposing side 114 of the base 110. As previously mentioned, the adhesive can also be the retention adhesive and engage the base side 184 of the screen protector 180, but the adhesive need not be the retention adhesive.

Figure 6:
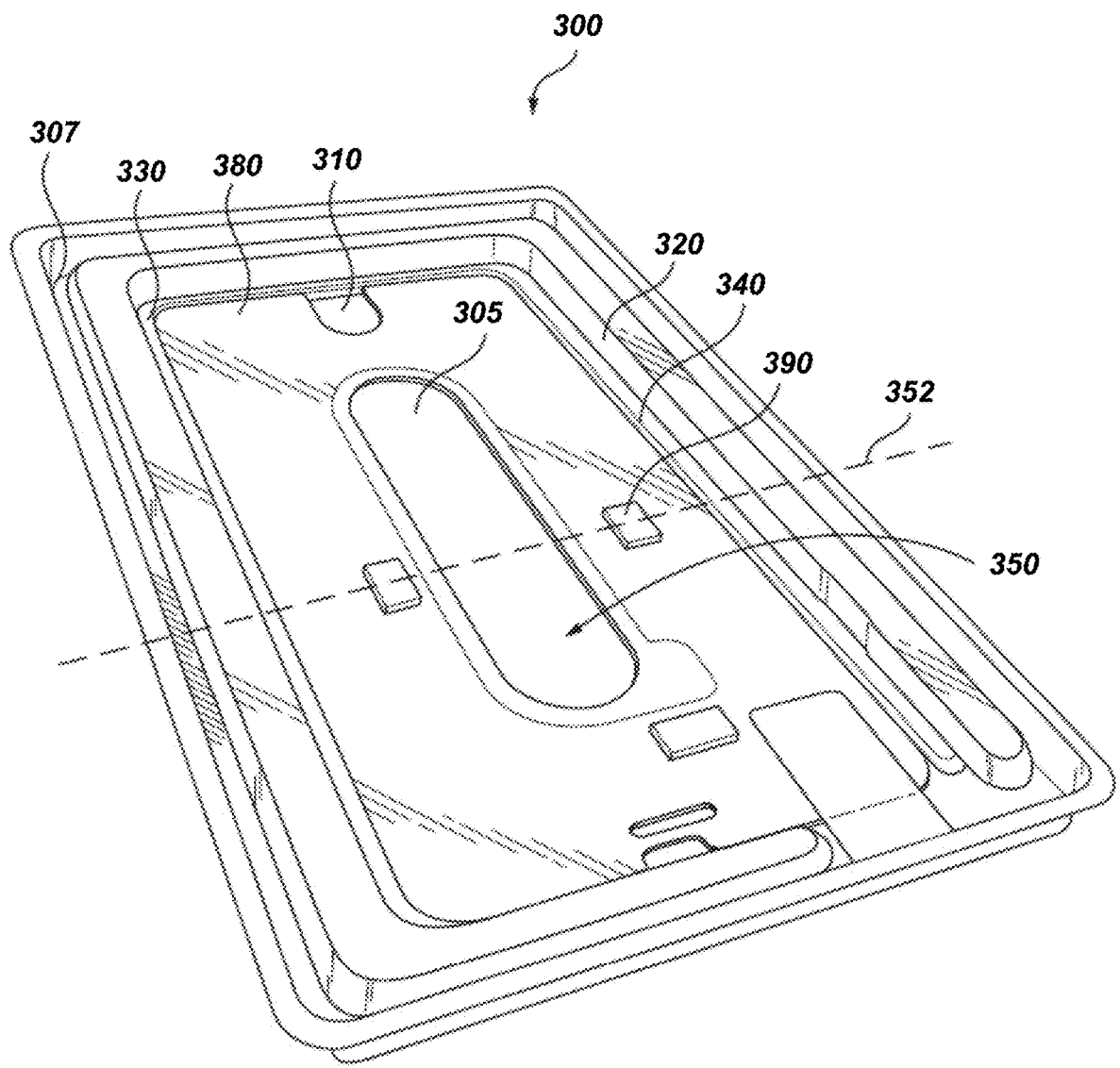
FIG. 6 is a perspective view of a screen protector installation system in accordance with one example of the invention.

Another embodiment of a mobile device screen protector installation system is illustrated in FIG. 6. In this example, the mobile device screen protector installation system is illustrated with the alignment tray 300 base-side down. The screen protector access aperture 350 is formed within the base 310 of the alignment tray 300. An optional removable cover 305 is illustrated as covering the entire screen protector access aperture 350. The removable cover 305 is oriented beneath the screen protector 380 which is transparent. The screen protector access aperture 350 notably extends across a major axis 352 of the alignment tray 300. Generally, the access aperture 350 can include one or more openings which allow a user access to the screen protector 380 to at least two points, one on each side of the major axis 352. Accordingly, a single elongate aperture may be used as illustrated, although two or more smaller apertures can also be used. The base 310 and the base walls 340 define the screen protector cavity. The screen protector 380 is retained within the screen protector cavity via the retention adhesive disposed on opposing sides of a plurality of spacing elements 390. The screen protector cavity is adapted to maintain a gap between the screen protector 380 and the alignment ridge 330. The alignment ridge 330 and the alignment walls 320 define the device alignment cavity. The packaging/gripping support structure 307 is also shown.

Figure 7A:
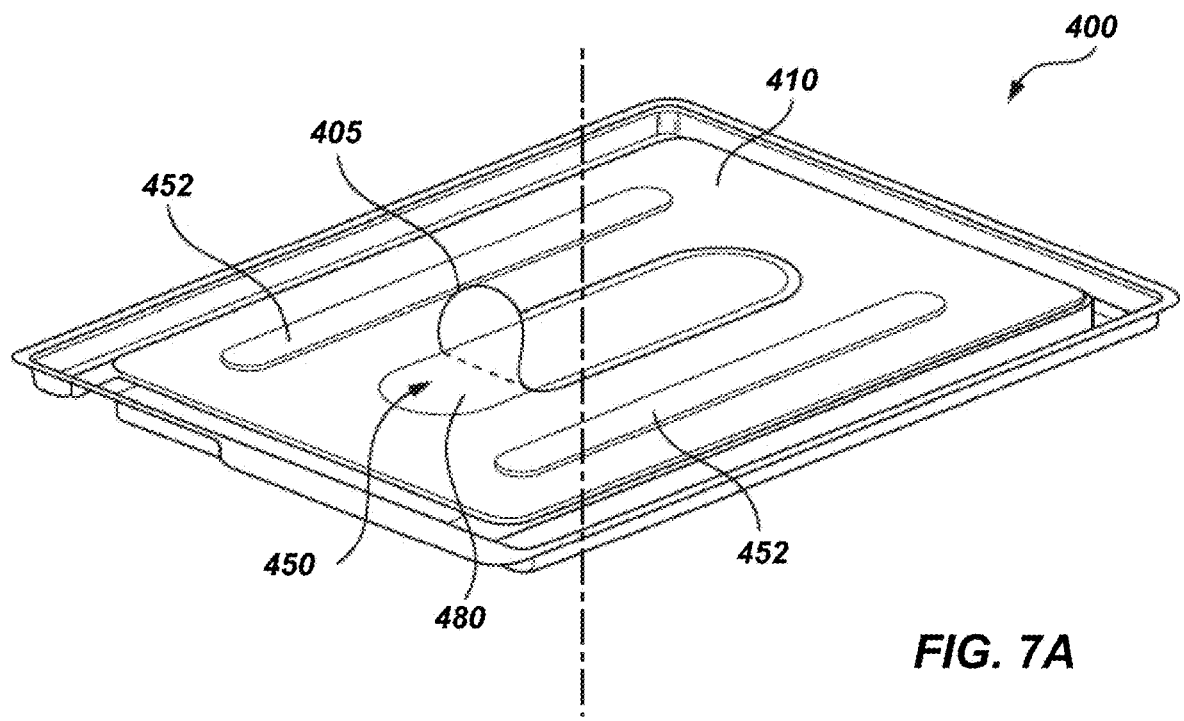
FIG. 7A is an applicator tray having a screen protector oriented within the tray in accordance with one example of the invention where the screen protector is oriented on an underside of the tray.
Figure 7B:
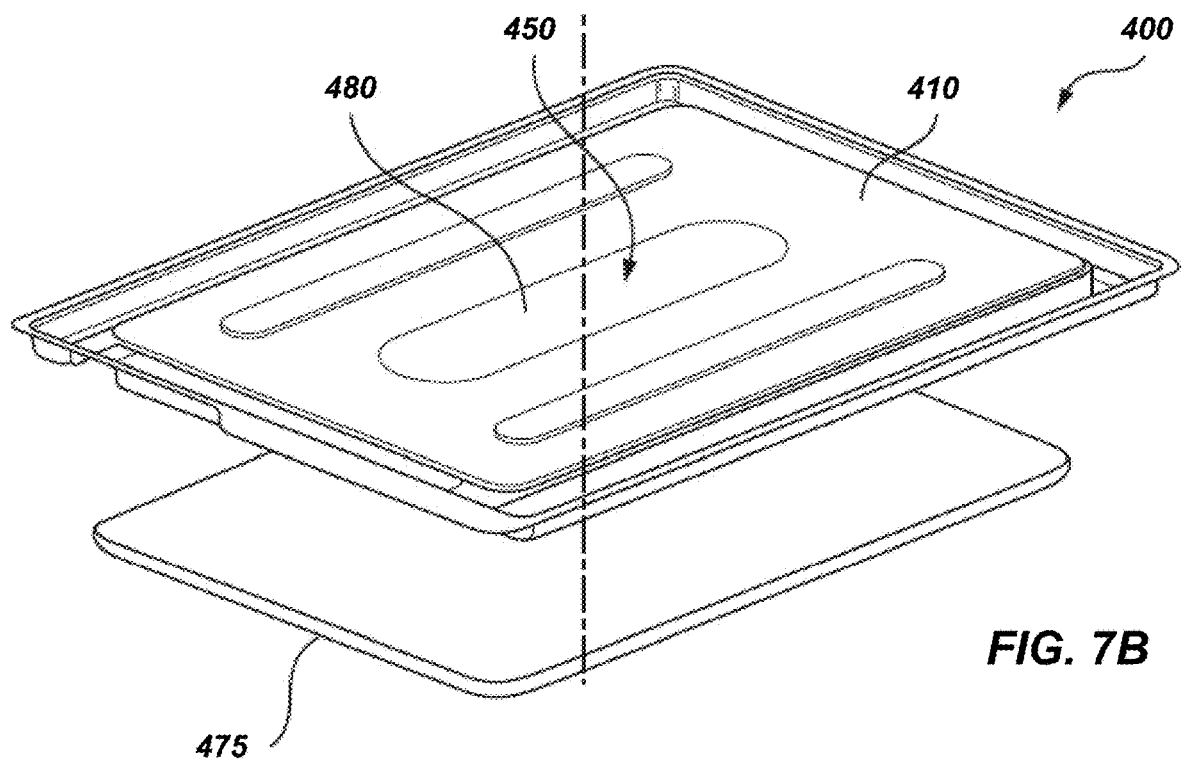
FIG. 7B is a view of the applicator tray with a mobile device oriented in an approach pattern for installation below the applicator tray in accordance with one example of the invention.
Figure 7C:
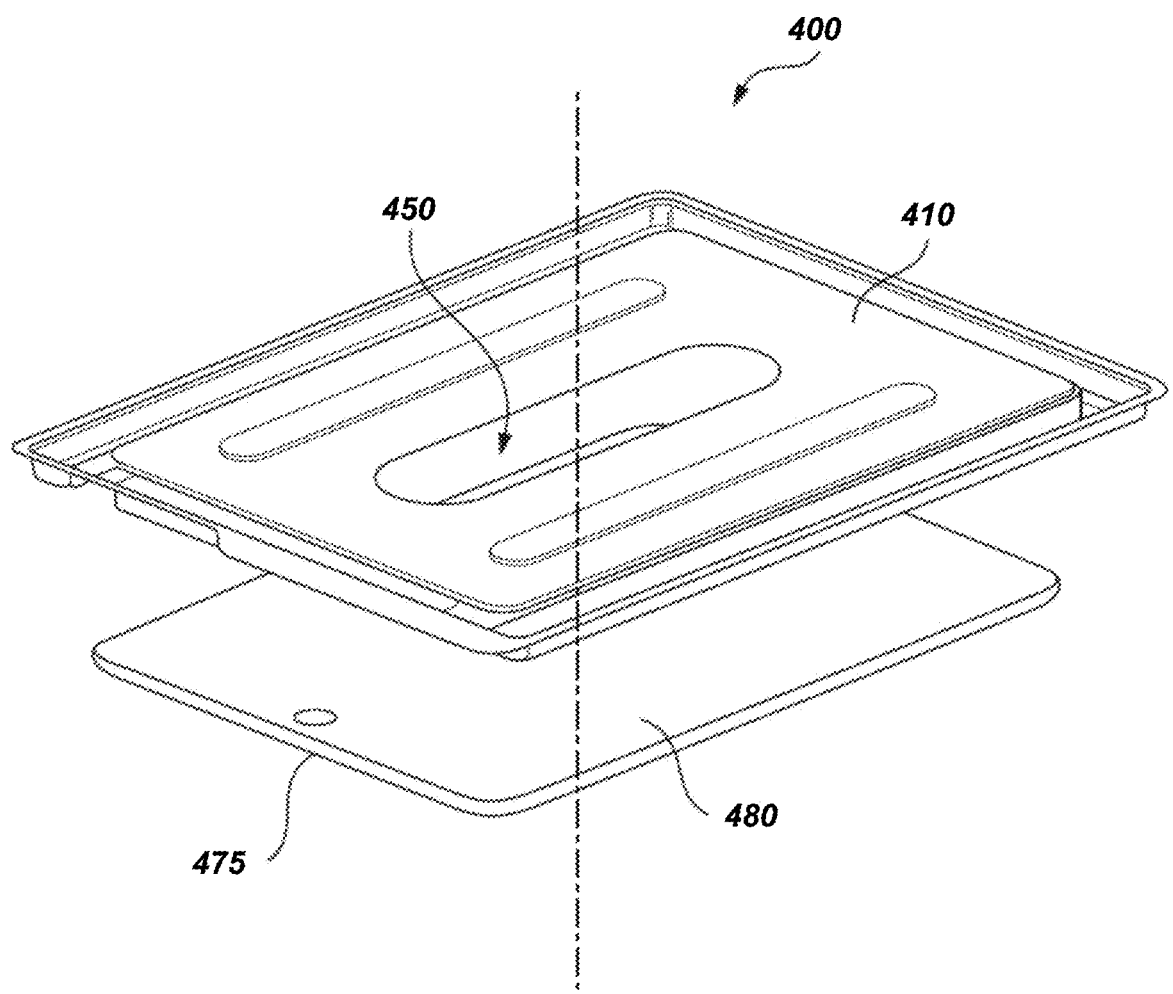
FIG. 7C is a view of the applicator tray after installation of the screen protector in accordance with one example of the invention.

FIGS. 7A-7C illustrate an embodiment of the mobile device screen protector installation system with the alignment tray 400 base-side up. In FIG. 7A, the screen protector access aperture 450 is formed within the base 410 of the alignment tray 400. In this case, the base 410 can include auxiliary access apertures 452. Such additional apertures can allow a user to apply pressure at additional points across the screen protector 480. This can be particularly useful for larger mobile devices such as tablets in order to fully engage edges of the screen protector 480 against a screen of the mobile device. The screen protector 480 can be seen through the screen protector access aperture 450. Additionally, an optional removable cover 405 is shown as partially withdrawn from the base 410 of the alignment tray 400.

FIG. 7B illustrates the alignment tray 400 above the mobile device 475 in preparation for aligning the screen protector 480 with the screen of the mobile device 475. The optional removable cover has been completely withdrawn so that the screen protector access aperture 450 has been completely exposed. The screen protector 480 can be seen through the screen protector access aperture 450.

In FIG. 7C, the screen protector 480 has been attached to the mobile device 475. A portion of the mobile device 475 having the attached screen protector 480 can be seen through the screen protector access aperture 450.

Another embodiment of the present technology can include a method of applying a mobile device screen protector. The method can include retaining a screen protector within an alignment tray. The screen protector can be a glass screen protector. As previously discussed, the alignment tray can include a screen protector access aperture. The alignment tray, including the retained screen protector, can be applied to a mobile device. The glass screen protector can be transferred from the alignment tray to the mobile device.

The screen protector can be interfaced with a screen of the mobile device. The alignment tray can be removed from the mobile device. Where a backing liner is used, it can be removed from the glass screen protector.

As previously discussed, the screen protector does not necessarily come into contact with the mobile device upon application of the alignment tray. The screen protector may be retained within the screen protector cavity such that there is a gap or space between the screen protector and the mobile device. However, the alignment tray can be adapted to bring the screen protector into contact with a screen of a mobile device upon application of the alignment tray.

One embodiment of this method is illustrated in FIGS. 7A-7C. As can be seen in FIG. 7A the screen protector 480 is retained within the alignment tray 400 via a retention adhesive, a glass screen protector retention feature, the like, or a combination thereof. The alignment tray 400 has a screen protector access aperture 450 through which the screen protector 480 can be seen and accessed. Additionally, as depicted in FIG. 7B, the alignment tray 400, including the retained screen protector 480, can be applied to a mobile device 475. As can be seen in FIG. 7C, the screen protector 480 can be disengaged from the retention adhesive, the glass screen protector retention feature, the like, or combination thereof and interfaced with a screen of the mobile device 475. The alignment tray 400 can then be removed from the mobile device 475. Thus, the mobile device 475 can be maintained substantially stationary during installation of the screen protector 480 and removal of the alignment tray 400.

Figure 8A:
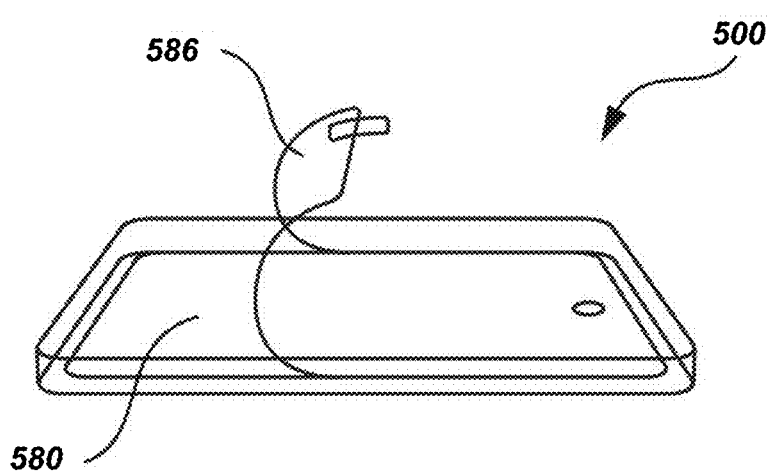
FIGS. 8A-8C represent an installation guide illustrating an installation process using the applicator tray of the present invention in accordance with one example of the invention.
Figure 8B:
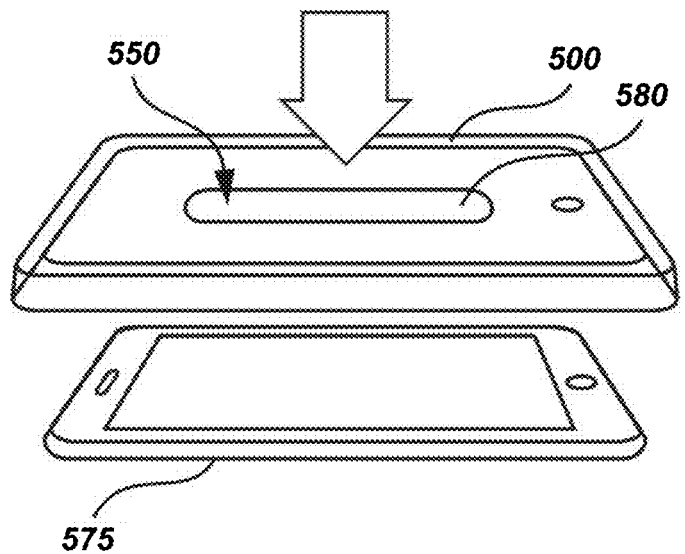
Figure 8C:
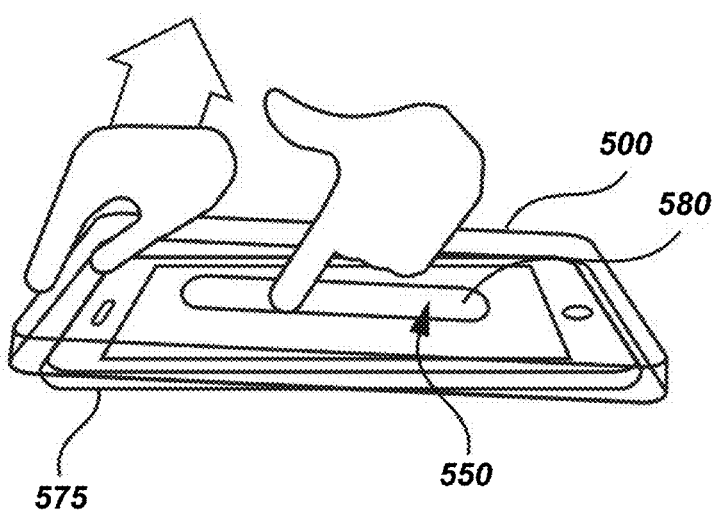

Another embodiment of this method is illustrated in FIGS. 8A-8C. The embodiment of the screen protector installation system illustrated in FIG. 8A includes a screen protector 580 with an optional release liner 586. The screen protector 580 is retained within the alignment tray 500 via a retention adhesive, a glass screen protector retention feature, the like, or a combination thereof. The optional release liner 586 can be removed prior to applying the alignment tray 500 to the mobile device. In FIG. 8B, the alignment tray 500 is applied to the mobile device 575. The screen protector 580 can be seen through the screen protector access aperture 550. As shown in FIG. 8C, once the alignment tray 500 is applied to the mobile device 575, the retention adhesive, the glass screen protector retention feature, the like, or a combination thereof can be disengaged from the screen protector 580. This can be done by compelling the screen protector 580 away from the alignment tray 500 via the screen protector access aperture 550 while maintaining the mobile device 575 within the device alignment cavity of the alignment tray 500. Compelling the screen protector 580 away from the alignment tray 500 can also interface or bring the screen protector 580 into contact with a screen of the mobile device 575. Thus, disengaging the retention adhesive, the glass screen protector retention feature, the like, or a combination thereof and interfacing the glass screen protector 580 with a screen of the mobile device 575 can occur contemporaneously.

In another embodiment (not shown), the screen protector can be retained within the alignment tray so that it comes into contact with or interfaces with the mobile device upon application of the alignment tray. In one aspect of this embodiment, a retention adhesive can be included on the removable cover. In this scenario, the retention adhesive can be disengaged by withdrawing the removable cover and associated retention adhesive from the alignment tray and screen protector. This allows the screen protector to be interfaced with the screen of the mobile device before withdrawing the retention adhesive. Once the removable cover is withdrawn, the screen protector is no longer adhered to the alignment tray, and the alignment tray can be removed. In another aspect of this embodiment, the screen protector can be retained within the alignment tray via a plurality of spacers having retention adhesive disposed on opposing sides, as previously described. Once the alignment tray is applied to the mobile device, the placement adhesive can sufficiently retain the screen protector to the mobile device so that the retention adhesive can be disengaged from the screen protector by removing the alignment tray. Thus disengaging the retention adhesive and removing the alignment tray can occur contemporaneously. In some examples, where a backing liner is removably attached to the base side of the glass screen protector, removing the alignment tray from the mobile device and removing the backing liner from the glass screen protector can occur contemporaneously.

Another embodiment of the current technology can include a mobile device screen protector installation kit. The kit can include an alignment tray and a screen protector. The alignment tray and screen protector can include any of the embodiments previously described herein. The kit can also include instructions for applying the screen protector to a screen of a mobile device.

The instructions can specify placing the alignment tray above the mobile device with the device side facing the mobile device and engaging the alignment tray onto the mobile device, as illustrated in FIGS. 7A-7C and FIGS. 8A-8C, for example. In some examples, the instructions can further specify at least partially withdrawing an optional removable cover from the alignment tray. The instructions can also specify engaging the glass screen protector to a screen of the mobile device by applying pressure to the screen protector via the screen protector access aperture. In some examples, the instructions can specify removing a release liner from the glass screen protector prior to engaging the alignment tray to the mobile device. In some examples, the instructions can also specify removing a backing liner from the glass screen protector after removal or upon removal of the alignment tray. The instructions can be provided in a number of ways. Some examples of how the instructions can be provided include instructions on an instruction card, on packaging, printed directly on the alignment tray, information provided to direct a user to obtain online instructions via a weblink, or any other suitable method of providing instructions.

The kit can also include additional kit components. Returning again the FIG. 4, the kit can include a packaging tray 165 with a kit component receptacle 167. Various kit components can be included in the kit component receptacle 167. Any suitable components for a mobile device screen protector installation kit can be included. Such kit components can include the instructions already specified, additional instructions for registering the kit or kit components with the manufacturer, additional instructions for cleaning the screen of the mobile device, dust removing stickers or equivalent, a cloth for cleaning the screen of a mobile device, a squeegee, and any other kit components suitable for inclusion in a mobile device screen protector installation kit.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A mobile device screen protector installation system, comprising:
   an alignment tray having a base, alignment walls, an alignment ridge, base walls, and a screen protector access aperture, wherein the base includes a device side and an opposing side, wherein the base walls are disposed at a perimeter edge of the base defining a screen protector cavity on the device side, the alignment ridge is disposed at a perimeter edge of the base walls, and the alignment walls are disposed at a perimeter edge of the alignment ridge, the alignment walls and alignment ridge defining a device alignment cavity, wherein the screen protector access aperture is formed within the base; and
   a glass screen protector retained within the screen protector cavity of the alignment tray, the glass screen protector having a placement side and a base side.

2. The system of claim 1, further comprising a plurality of spacing elements disposed between the glass screen protector and the base and oriented to maintain a gap between the base and the glass screen protector.

3. The system of claim 1, wherein the glass screen protector is retained within the screen protector cavity via a retention adhesive contacting the base side of the screen protector and the device side of the base.

4. The system of claim 1, further comprising a plurality of glass screen protector retention features oriented along the base walls and forming a physical interference fit to retain the glass screen protector within the screen protector cavity.

5. The system of claim 1, wherein the alignment tray is formed of a molded transparent film.

6. The system of claim 1, wherein the device alignment cavity has a fit tolerance of less than 1 mm.

7. The system of claim 1, wherein the glass screen protector includes a release liner on the placement side.

8. The system of claim 1, wherein the glass screen protector includes a placement adhesive on the placement side.

9. The system of claim 1, wherein the alignment ridge is spaced a depth to align the glass screen protector with a screen of a mobile device without contacting the glass screen protector with the screen.

10. The system of claim 1, wherein the alignment tray further comprises a packaging insert retention feature.

11. The system of claim 1, wherein the alignment tray further comprises device orientation instructions printed on or molded into the alignment tray.

12. A method of applying a mobile device screen protector, comprising:
   retaining a glass screen protector within an alignment tray, the alignment tray having a screen protector access aperture;
   applying the alignment tray to a mobile device;
   interfacing the glass screen protector with a screen of the mobile device;
   transferring the glass screen protector from the alignment tray to the mobile device; and
   removing the alignment tray from the mobile device.

13. The method of claim 12, wherein the glass screen protector is retained within the alignment tray via a retention adhesive.

14. The method of claim 13, further comprising disengaging the retention adhesive from the glass screen protector by compelling the glass screen protector away from the alignment tray via the screen access aperture while maintaining the mobile device within the device alignment cavity of the alignment tray.

15. The method of claim 12, wherein the glass screen protector is retained within the alignment tray via a glass screen protector retention feature.

16. The method of claim 12, wherein transferring the glass screen protector from the alignment tray includes compelling the glass screen protector away from the alignment tray via the screen protector access aperture while maintaining the mobile device within a device alignment cavity of the alignment tray.

17. The method of claim 12, wherein interfacing the glass screen protector with a screen of the mobile device occurs upon applying the alignment tray to the mobile device.

18. A mobile device screen protector installation kit, comprising:
   an alignment tray having a device side and an opposing side, wherein the alignment tray has a screen protector access aperture;
   a glass screen protector; and
   instructions for applying the glass screen protector to a screen of a mobile device, wherein the instructions specify placing the alignment tray above the mobile device with the device side facing the mobile device and engaging the alignment tray onto the mobile device.

19. The kit of claim 18, further comprising a cleaning cloth, dust removal stickers, or a combination thereof.

20. The kit of claim 18, wherein the instructions further comprise:
   specifying engaging the glass screen protector to a screen of the mobile device by applying pressure to the glass screen protector via the screen protector access aperture.

* * * * *